Sept. 27, 1955     N. CORDIS     2,718,969
SILO THROWDOWN

Filed Oct. 2, 1953     4 Sheets-Sheet 1

INVENTOR
Nat Cordis
BY Everett A. Johnson
ATTORNEY

Sept. 27, 1955 N. CORDIS 2,718,969
SILO THROWDOWN
Filed Oct. 2, 1953 4 Sheets-Sheet 2

INVENTOR
Nat Cordis
BY Everett A. Johnson
ATTORNEY

Sept. 27, 1955   N. CORDIS   2,718,969
SILO THROWDOWN
Filed Oct. 2, 1953   4 Sheets-Sheet 3

INVENTOR
Nat Cordis
BY Everett A. Johnson
ATTORNEY

Sept. 27, 1955  N. CORDIS  2,718,969
SILO THROWDOWN

Filed Oct. 2, 1953  4 Sheets-Sheet 4

INVENTOR
Nat Cordis

BY Everett A. Johnson
ATTORNEY

United States Patent Office 2,718,969
Patented Sept. 27, 1955

2,718,969

SILO THROWDOWN

Nat Cordis, Silver Lake, Wis.

Application October 2, 1953, Serial No. 383,888

5 Claims. (Cl. 214—17)

This invention relates to a silo unloader of the type in which the silage is cut loose from the upper surface thereof in a silo by a slowly descending rotator, carried in toward the center of the silo and discharged laterally from the silo through the outer chute opening in the side thereof.

The purpose of the invention, generally stated, is to provide an improved silo unloader of the type described with which only a desired quantity of silage can be quickly, easily and safely removed from a silo. Thus, the principal object of the invention is to provide, in a silo of the type described, new and improved means for loosening and picking up the silage for discharge from the silo.

One of the objects of the invention is to provide an improved unloader which is of simple and sturdy construction, is inexpensive to manufacture, can be separated into relatively small units so as to pass through the narrow opening in the side of the silo and yet is easy to assemble in place.

Another object is to provide an improved unloader which will remove immediately all loosened silage from the underlying uncut surface thereby materially reducing spoilage of silage.

A further object is to provide an improved unloader which will remove the loosened silage over the entire exposed area up to the wall of the silo without injury to the wall, irrespective of variations in the shape or curvature of the wall.

Still another object of the invention is to provide an improved silo unloader which will be economical in operation and which is capable of handling all types of silage under wide temperature conditions. These and other objects and advantages of the invention will become apparent to those skilled in the art as the description of my invention proceeds.

Briefly, these and other objects are attained by providing a system which includes broadly an elevating frame, a rotatable delta-shaped cutter and elevator assembly below the frame, a platform on which the elevator discharges, said elevator rotating with the delta assembly, and an unloader mechanism carried by the frame and adapted to remove silage from the platform and discharge directly from the silo. The delta assembly comprises a horizontally disposed cutter arm which extends radially from a central hub supported by the frame, a radially extending and inclined trough elevator, and a cordally-extending return conveyor flight. An endless conveyor travels through these flights in series and carries laterally extending rake members. These rake members include a plurality of tines which loosen and convey silage to the central inlet of the inclined conveyor trough. In passing through the trough the rake-like conveyor paddles carry the silage upwardly from the trough and discharge from the upper end thereof onto the platform which rotates to the delta assembly below the discharge end of the conveyor flight.

The cutting and conveying action results from the simultaneous radial travel of the rakes and the rotational travel of the conveyor arm over the surface of the silage. Further details will be developed as the invention is described in connection with the accompanying drawings.

In the accompanying drawings, wherein like elements in the several views are designated by the corresponding reference characters, an embodiment of my invention is illustrated wherein.

Figure 1:
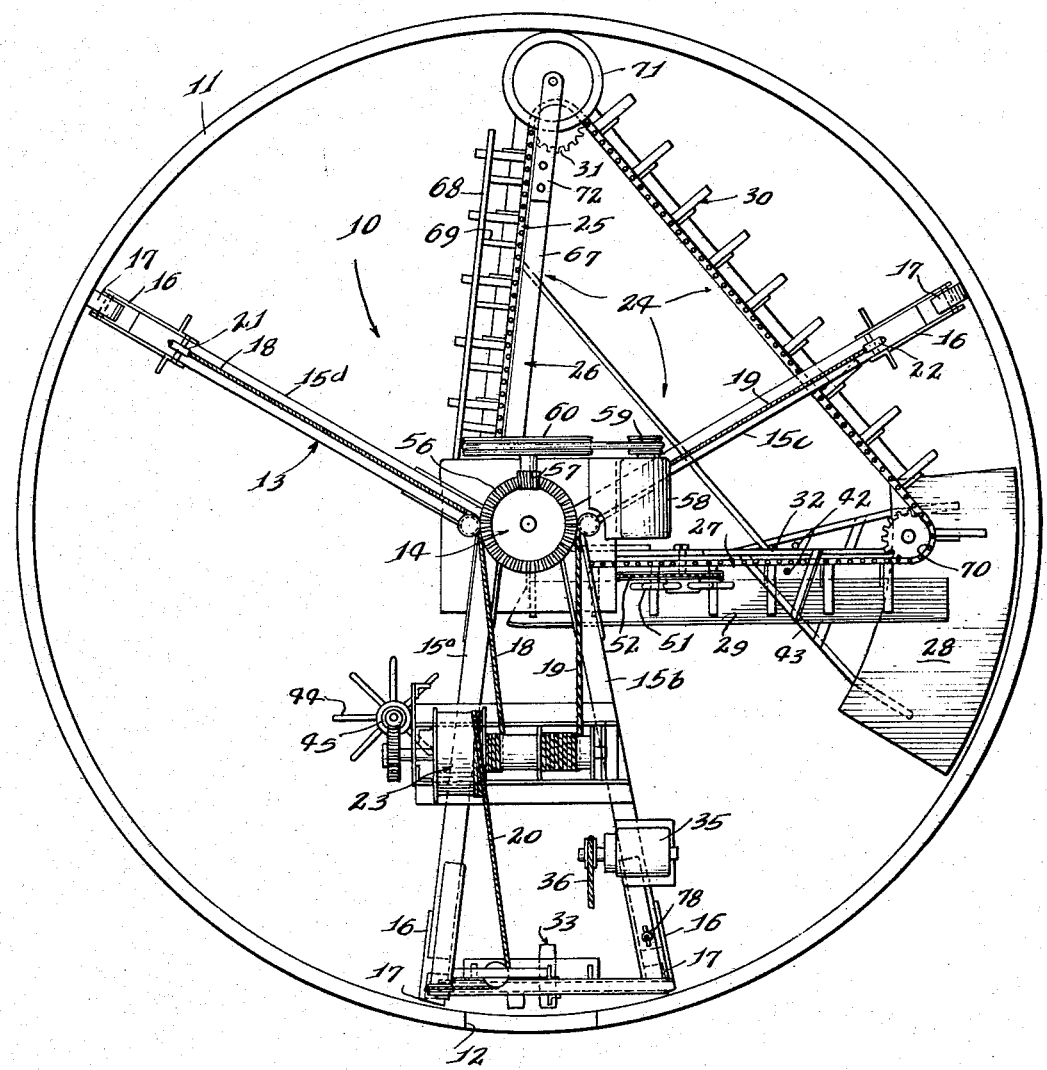
Figure 1 is a plan view showing the unloader in an operative position within a silo.

Referring to the drawings, the invention comprises an unloader 10 which is positioned in a silo 11 above the upper surface of the silage. The silo 11 is approximately round and is provided at at least one point in its side wall with a tier of narrow discharge openings 12. The tier of openings 12 extends vertically for practically the entire height of the silo 11 to facilitate unloading at any elevation. In any event, except for my unloader 10, the silo features are more or less conventional, form no part of this invention and will not be further described.

The unloader 10 includes a vertically movable frame 13 of generally Y-shaped form which is suspended within the silo 11. The frame 13 includes a centrally apertured hub portion 14 of metal construction to which laterally extending beams 15a, 15b and 15c are secured. The beams are preferably of wooden construction and are provided at their outer ends with adjustably positioned brackets 16 in which vertically disposed rollers 17 are journaled. The rollers 17 are adapted to engage with the silo wall 11 to center the hub 14 of the frame 13 within the silo 11 while at the same time avoiding rotation of the frame 13 therein. The frame 13 is freely suspended within the silo 11 by means of three vertically extending cables 18, 19 and 20 which pass under circumferentially spaced pulleys 21 and 22. The cables are secured to a suitable payout or winch mechanism 23 which is carried by the unloader frame 13. By paying out the cables from the winch 23, the unloader 10 will be lowered within the silo 11 under its own weight.

Below the frame 13 and rotatably fixed to the central hub 14 is a combination silage cutter and elevator 24 which is of substantially triangular or delta shape. An endless conveyor 25 passes around the cutter-elevator 24 in a closed circuit. The lowermost leg 26 of the delta assembly 24 is substantially horizontal and extends radially from the central hub 14. The elevator flight 27 of the conveyor 25 extends from the plane of the first cutter leg 26 and is inclined upwardly so as to discharge onto a rotated platform 28. The elevator leg 27 includes an elevator trough 29 in which the silage is pushed by the rakes 30 carried by the endless conveyor 25. At the upper end of the elevator flight 27, the silage is discharged from the rakes 30 and from the trough 29 onto the platform 28. The empty conveyor 25 then travels downwardly out of contact with the silage to the periphery of the silo where it passes about an idler sprocket 31 journaled in the delta frame 24 and travels radially inward along the cutter arm 26. In so traveling, the rakes 30 extending laterally from the endless conveyor 25 cuts and conveys the silage from the upper surface thereof. Simultaneously, the delta assembly 24 is rotated about the central hub 14 with the result that a continually renewed surface of silage is exposed to the cutter arm 26 of the conveyor 25.

The platform 28 is suspended from the elevating arm 32 of the delta assembly 24 and, therefore, collects the silage discharged from the upper end of the trough 29. However, when the platform 28, which is relatively long in the direction of travel, reaches the discharge port 12 a second conveyor system 33 removes the accumulated silage from the platform 28. The second conveyor system 33 is suspended below the double beamed portion 15a—15b of the Y-frame 13 and includes a drive shaft 34 which is driven by a motor 35 and belt 36. The second elevator 33 includes a pair of idler sprockets 37 and 38 and a drive sprocket on shaft 34. Endless chain conveyors 39 and 40 carrying rake elements 41 pass about these sprockets and radially of the silo adjacent the surface of the platform 28. Thus, when the platform 28 moves below the unloader conveyor 29, the accumulated silage is progressively discharged laterally through the port 12.

The delta assembly 24 carries upstanding pins 42 on the frame 43 supporting the trough 29. These pins 42 are adapted to engage a rimless spoked wheel 44 which is, in turn, fixed to a worm gear means 45 which controls the release of the cable from the winch 23. Thus, as the scraper-cutter 24 is rotated below the frame 13 each rotation thereof releases an increment of the suspending cables 18, 19 and 20. This maintains a proper contact of the cutter arm 26 with the surface of the silage.

The central hub 14 is provided with an exterior rotatable sleeve 46 carrying a ring gear 47. The ring gear 47 is driven by a second worm gear 48 integral with a shaft 49 carrying a driven sprocket 50. The motive power for driving the sprocket 50 and hence for rotating the sleeve 46 on the hub 14 is as follows:

As the conveyor 25 moves upwardly through the trough 29, each rake flight 30 engages a rimless spoked wheel 51 which is connected by means of a drive chain 52 to the driven sprocket 50. The delta assembly 24 is in turn rotatably supported by beam 53 and sleeve 46 on hub 14. Therefore, when the endless conveyor 25 travels through its cycle it is driving the sleeve 46 which supports the beam 53 and conveyor 25 and thereby causes the delta assembly 24 to rotate about the hub 14. In so doing, the worm gear 48 travels about the fixed ring gear 47 carried by the hub 14.

The power for driving the endless conveyor 25, however, is provided by means of a driven sprocket 54 at the base of the hub 14. This driven sprocket 54 is fixed to a vertical shaft 55 which terminates above the frame 13 in a ring gear 56. A pinion gear 57 driven by a motor 58 (and pulleys 59—60) carried by the frame 13 in turn drives the ring gear assembly 56.

It will be seen, therefore, that a single motor 58 provides the motive power for a series of operations. First it drives the conveyor drive sprocket 54. The conveyor 25, so driven, in turn imparts rotational motion to the delta assembly 24 and the rotation of the delta assembly 24 controls the suspending-cable winch 23.

Figure 6:
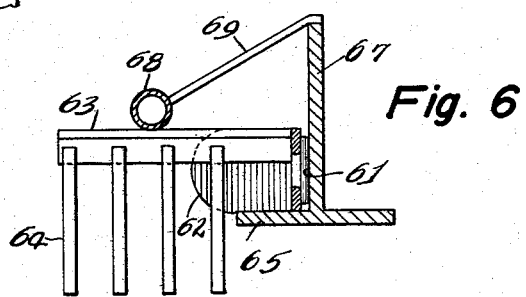
Figure 6 is a section taken along the line 5—5 in Figures 2 and 3.
Figure 4:
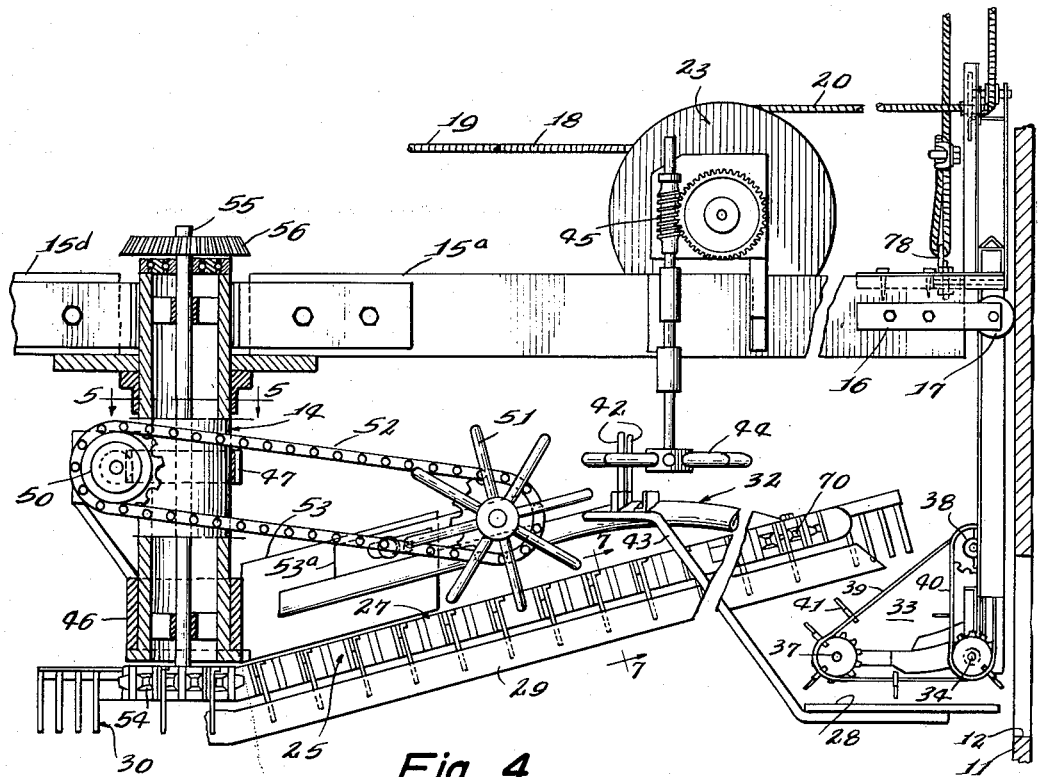
Figure 4 is an elevation along the line 4—4 in Figure 2 showing the elevator flight and the ultimate silage discharge or throwdown means.
Figure 7:
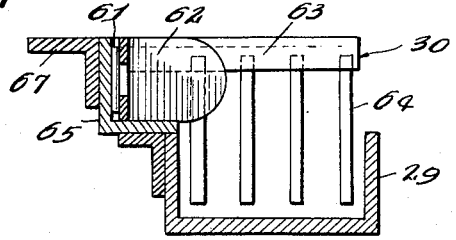
Figure 7 is a section taken along the line 7—7 in Figures 2 and 4.
Figure 5:
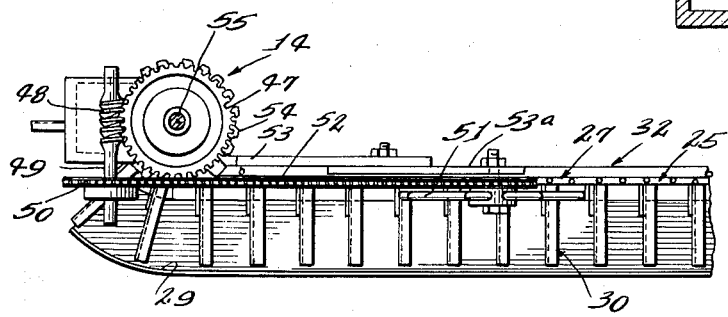
Figure 5 is a fragmentary top view of Figure 4.
Figure 8:
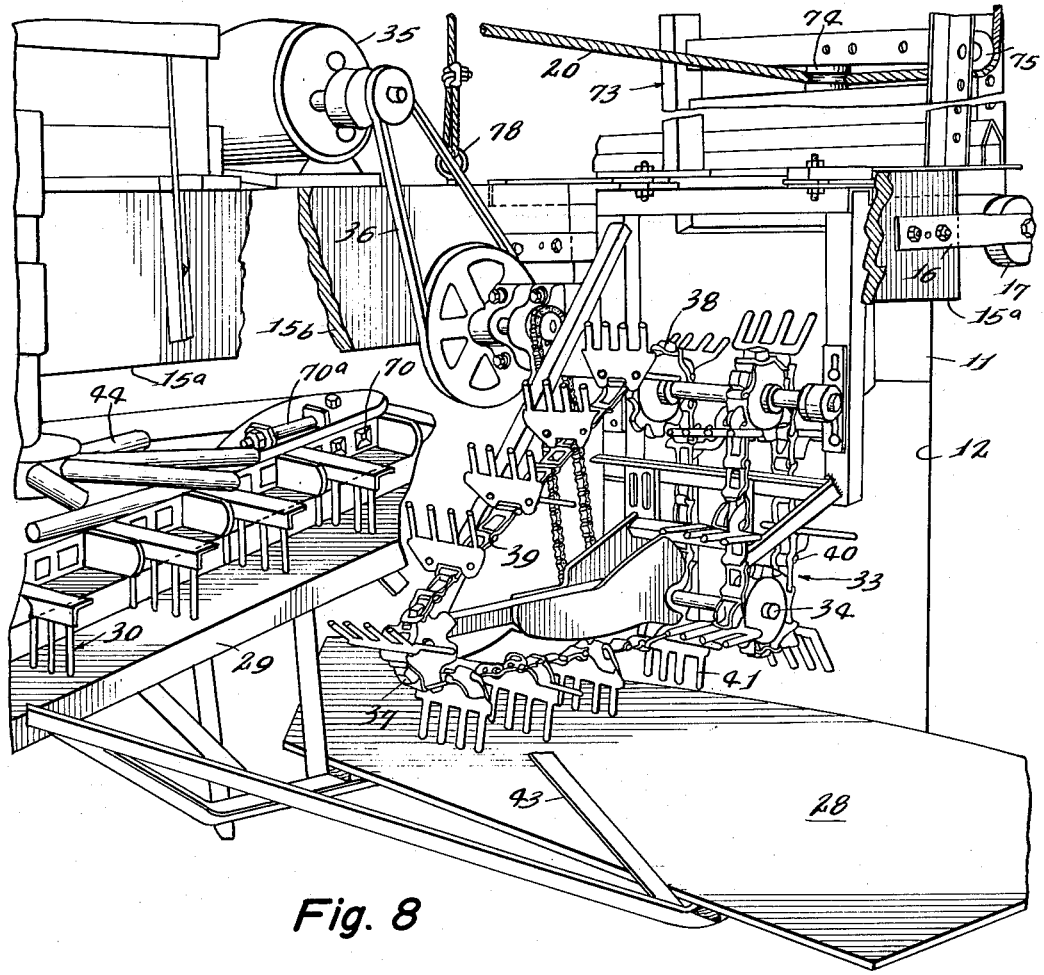
Figure 8 is a perspective of the discharge end of the elevator and suspended platform.

Referring to Figure 6 showing a cross section through the delta conveyor assembly 24, the conveyor 25 includes a chain 61 which supports an attachment plate 62 carrying the laterally extending arm 63 to which the tines 64 are attached. The base edge of the attachment plate 62 and the lower edge of the chain 61 travel within the guideway 65 provided by the frame member 67 of the delta assembly 24. A generally similar structure is shown in Figure 7, but overlying the elevator trough 29. When traveling along the cutter arm 26, the lateral arms 63 and hence the tines 64 are held in contact with the silage by means of the guide-rod 68 which is supported by straps 69 from the frame member 67.

Figure 2:
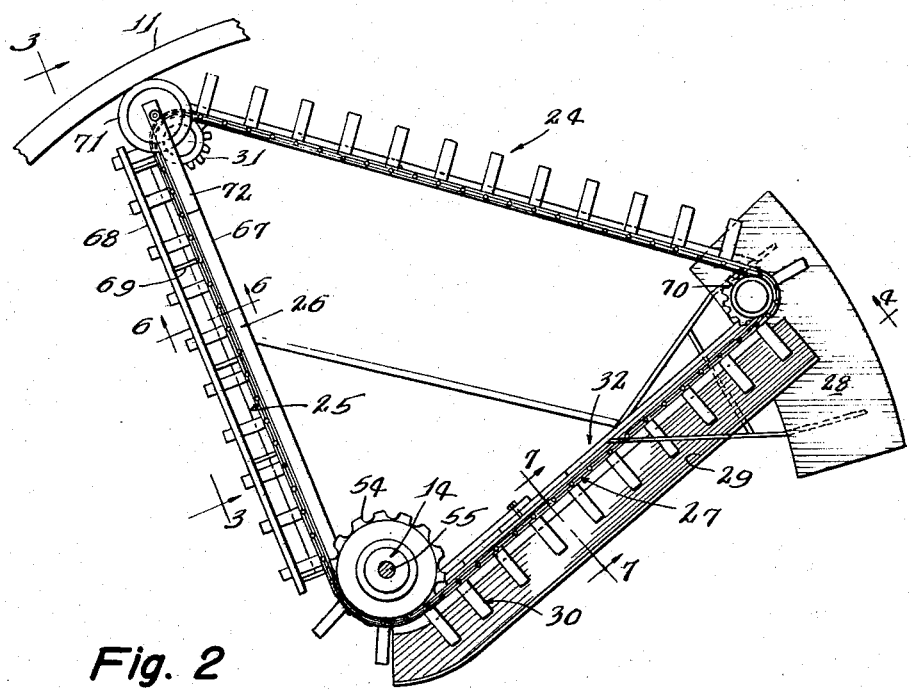
Figure 2 is a fragmentary plan view through the unloader taken immediately below the fixed frame and immediately above the rotatable cutter and elevator assembly.
Figure 3:
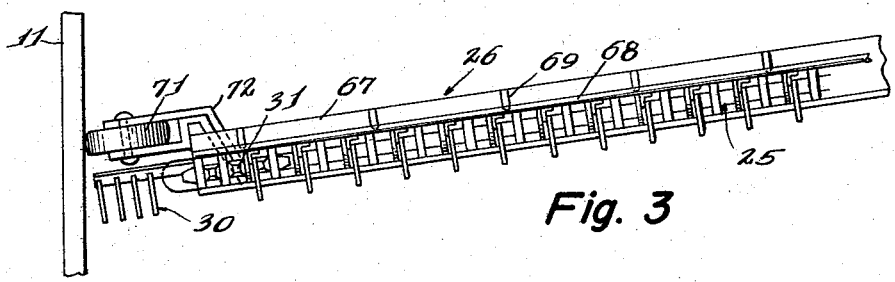
Figure 3 is an elevation partly in section showing the cutter arm assembly viewed along the line 3—3 in Figure 2.

The delta assembly 24, as shown in Figures 2 and 3, includes the drive sprocket 54, an idler sprocket 70 which is adjustably supported adjacent the discharge end of the trough 29, and a third idler sprocket 31. The chain 61 of the conveyor 25 travels about these sprockets and carries with it the rake elements 30 as described. Adjacent the idler sprocket 31 is a guide roller or wheel 71 which contacts the wall 11 of the silo and is fixed by bracket 72 to the frame 67.

Figure 9:
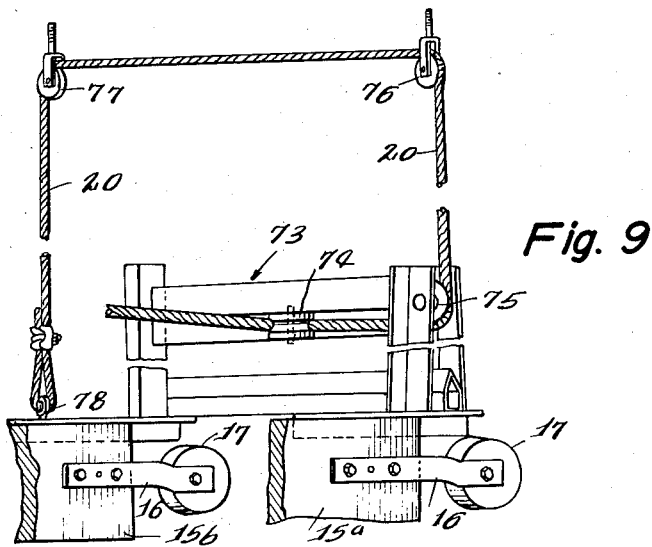
Figure 9 is a view showing the means for suspending one end of the Y-frame.

With reference to Figure 9, I have shown the details of the cable suspending system which includes a supporting frame 73 carried by the outer ends of beams 15a and 15b. This frame 73 supports a horizontally disposed pulley 74 and a vertically disposed pulley 75 about which the cable 20 is passed upwardly to the supporting pulleys 76 and 77. The cable 20 then passes downwardly to the Y-frame where it is anchored by loop 78. It will be understood that the other end of the cable 20 is fixed about the winch 23.

The conveyor 33 is shown as being suspended from frame 13. It is contemplated, however, that this conveyor 33, or its equivalent, may be removably mounted on the wall of the silo 11 so as to discharge silage from the platform 28 through the port 12.

In the operation of my silo throwdown, the motor 58 is controlled by a master switch and this motor 58 drives the pulley system 59—60 which in turn drives the pinion gear 57 and rotates the ring gear 56. When this occurs, the conveyor 25 begins to move in its circuit along the cutter leg 26, the elevator leg 27 and back along the idler leg of the delta frame 24. This movement of the conveyor 25 draws the rakes 30 across the surface of the silage carrying the removed silage toward the hub 14 and up the trough 29. This same motion, by means of the spoked wheel 51, the chain 52 and the driven gear 50, causes the worm gear 48 to travel around the fixed ring gear 47 which is carried by the hub 14. The platform 28, being suspended by frame 43 below the discharge end of the conveyor 29, likewise travels about the silo with the delta unit 24.

When the platform 28 filled with silage reaches the port 12 below the frame 13, the conveyor 33 removes the silage. The arrival of the elevator flight 27 actuates the wheel 44 causing it to turn the worm gear means 45 which operates the shaft of the winch 23 to release the desired lengths of the cables 18, 19 and 20. To compensate for the greater length of cable 20 (it goes to the top of the silo and back down to the frame 20), the winch 23 is made in two different sizes. Accordingly, the same amount of turning of the winch drum 23 releases the appropriate length of cables 18 and 19 and cable 20.

From the above description of my invention, it will be apparent that I have provided an efficient and mechanically rugged device which is substantially adapted for the handling of shreaded or fibrous material and specifically for discharging such material from relatively inaccessible silos, bins and the like.

Although I have described my invention with respect to a particular embodiment thereof, it is to be understood that this is merely for the purpose of illustration and that modifications therein are contemplated without departing from the spirit of my invention or from the scope of the appended claims.

What I claim is:

1. A combination silage cutter and conveyor for use on silo unloaders of the type including a vertically suspended frame which comprises in combination a generally delta-shaped subframe, said subframe comprising a chain guide means, an endless chain cutter-conveyor means arranged for travel about said subframe in said guide means, means for supporting said subframe with one side and two corners thereof at the surface of the silage in said silo, means for supporting the third corner of said subframe at an elevated position, means for supporting a platform on said subframe below said elevated corner, one edge of said platform conforming generally to the silo wall, means for rotating said subframe and platform about the center of said silo, means for moving said endless conveyor means about said subframe and said third corner above said platform, and means for periodically discharging silage from said platform out of said silo.

2. In a silo unloader for installation in a silo above the surface of the silage for use in removing silage therefrom, a vertically movable frame means which is adapted to be centered in the silo and fixed against rotation, a hub means carried by said frame means, a radially disposed cutting arm means which is rotatably supported in its inner end to said hub means, radially movable endless chain conveyor means in said cutting arm means, a plurality of rake-like cutters carried by said endless conveyor and extending transverse to the direction of travel of said conveyor for cutting the silage loose from the upper surface of the silage and for conducting the loosened silage radially inward, a conveyor elevator extending radially from the center of the silo toward the wall thereof and rotatable with said cutter arm means, said endless flexible conveyor means traveling along said cutter arm means and along said conveyor elevator in series, a collection platform rotatable with said conveyor elevator and disposed below the discharge end thereof and above the surface of the silage, and silo discharge means carried by said frame for removing silage from said platform as it is rotated in respect of said frame and brought in register with said discharge means.

3. An endless cutter-conveyor system for use in silos which comprises a trilegged frame member having three corners, a drive sprocket means at one corner of said frame member, means for rotating said frame member about the axis of said drive sprocket, an endless conveyor means arranged for travel about said three corners, said conveyor means comprising an endless flexible chain, a laterally extending bracket fixed to spaced links in said chain, a plurality of tines depending from said bracket to provide a rake-like conveyor flight extending laterally from said endless chain, an inclined trough fixed along one of said legs and extending from said driven sprocket to a point adjacent the wall of said silo, an elevated platform supported by said trilegged frame and adapted to rotate in said silo about the axis of rotation of said driven sprocket, said cutter-conveyor being adapted to loosen silage and to convey said silage through said trough onto said elevated platform, and means for removing such silage from said elevated platform upon each rotation of said frame member.

4. In a silo unloader for suspension in a silo on the surface of the silage therein, a vertically movable Y-frame its outer ends having contact with the sides of said silo to center it therein, a rotatable subframe of generally delta-shape arrangement in a plane inclined from the surface of said silage, an endless conveyor means traveling about the corners of said subframe, means on said conveyor for cutting the silage loose from the upper surface of the silage and for transferring the loosened silage to a point of discharge, an electric motor mounted on the Y-frame for operating said last mentioned means, drive gear means associated with said subframe means, a rimless spoked wheel carried by said subframe and rotated by the travel of said conveyor means, said rimless spoked wheel and gear means being adapted to cause rotation of said subframe, a payout winch on said Y-frame, a plurality of suspending cables fixed to and about said winch means, and co-operating trip means carried by said Y-frame and by said subframe adapted to release said winch a selected rate upon each rotation of the said subframe below said Y-frame within said silo.

5. In a silo unloader for suspension within a silo to remove silage therefrom, the improvement which comprises a vertically movable frame which is adapted to be centered in the silo and fixed against rotation therein, a multiple hub carried by said frame near the center of said silo, a generally triangular subframe rotatably supported below said frame on said hub, a silage collection platform carried by said subframe and adapted to rotate therewith, an endless flexible cutting and conveyor means arranged to travel about said subframe, one leg of said subframe being radially disposed to be rotated in contact with the surface of the silage, an inclined trough means supported parallel to a second leg of said subframe having one end in contact with the silage and the other end substantially thereabove, a plurality of radially extending cutter-rakes carried by said endless conveyor means about said subframe, said conveyor means transporting silage upwardly through said trough means and discharging it therefrom onto said platform, means for removing said silage from said rotated platform and for discharging such removed silage from said silo, and means for causing the simultaneous rotation of said subframe about said hub and travel of said endless conveyor means about said subframe whereby said cutter-rakes loosen and transport silage to the center of said silo and upwardly through said conveyor onto said platform.

References Cited in the file of this patent

UNITED STATES PATENTS

| | | |
|---|---|---|
| 1,190,300 | Kuhn | July 11, 1916 |
| 1,479,990 | Keys | Jan. 8, 1924 |